United States Patent
Steinhauser et al.

(10) Patent No.: US 8,378,266 B2
(45) Date of Patent: Feb. 19, 2013

(54) SMART LAYERED HEATER SURFACES

(75) Inventors: Louis P. Steinhauser, St. Louis, MO (US); Kevin Ptasienski, O'Fallon, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 1307 days.

(21) Appl. No.: 11/475,534

(22) Filed: Jun. 27, 2006

(65) Prior Publication Data

US 2007/0000918 A1   Jan. 4, 2007

Related U.S. Application Data

(60) Provisional application No. 60/695,248, filed on Jun. 29, 2005.

(51) Int. Cl.
*H05B 3/68* (2006.01)
*H05B 3/10* (2006.01)

(52) U.S. Cl. ........................ 219/443; 219/548

(58) Field of Classification Search .... 219/443.1–468.2, 219/497, 504, 505, 538–548
See application file for complete search history.

(56) References Cited

U.S. PATENT DOCUMENTS

| | | | | |
|---|---|---|---|---|
| 3,953,711 A * | 4/1976 | Eck et al. | | 219/458.1 |
| 5,280,422 A * | 1/1994 | Moe et al. | | 700/23 |
| 5,304,784 A * | 4/1994 | Tagashira et al. | | 219/543 |
| 5,808,777 A * | 9/1998 | Lynam et al. | | 359/265 |
| 6,037,572 A * | 3/2000 | Coates et al. | | 219/451.1 |
| 6,150,636 A * | 11/2000 | Bogdanski et al. | | 219/461.1 |

* cited by examiner

*Primary Examiner* — Sang Paik
(74) *Attorney, Agent, or Firm* — Brinks Holfer Gilson & Lione

(57) ABSTRACT

A heater system and related methods of heating a surface are provided by the present disclosure that includes, in one form, a substrate defining a heating surface and a layered heater formed on the heating surface. A plurality of nodes are disposed along the heating surface and are in electrical contact with a resistive heating layer of the layered heater, along with a plurality of lead wires connected to the plurality of nodes. In one form, a multiplexer is in communication with the plurality of nodes through the plurality of lead wires, and a controller is in communication with the multiplexer, wherein the multiplexer sequences and transmits resistances from the plurality of nodes to the controller, and the controller controls an amount of power provided to each of the plurality of nodes based on the differences in resistances between the nodes.

19 Claims, 8 Drawing Sheets

SMART LAYERED HEATER SURFACES

CROSS-REFERENCE TO RELATED APPLICATIONS

This application claims the benefit of U.S. Provisional Application No. 60/695,248, filed on Jun. 29, 2005, and titled "Smart Layered Heater Surfaces." The disclosure of the above application is incorporated herein by reference.

FIELD

The present disclosure relates generally to electrical heaters and more particularly to heaters and related methods for controlling and improving temperature response time and schedules of a thermal loop for heating surfaces employed in cooking grill applications, among others.

BACKGROUND

The statements in this section merely provide background information related to the present disclosure and may not constitute prior art.

In known applications such as cooking grills in commercial environments, a relatively large mass is provided as a cooking surface in order to reduce overall temperature variations during cooking cycles. This large mass, which is typically aluminum or cast iron, provides what is often referred to as thermal inertia, such that placing items to be cooked on a cooking surface of the grill, e.g., a cold hamburger patty or an egg, does not significantly decrease the overall mass temperature.

Many known grill constructions generally include heating elements secured to the underside of a grill. The heating elements are typically tubular or strip heaters and are mechanically clamped and bolted to the underside at spaced intervals. In another known grill construction, tubular heaters are cast into the large mass grill to improve contact between the heating element and the grill and thus provides for improved heat transfer.

Because of the large mass of the grill and because most constructions do not provide intimate contact between the heaters and the grill, it has not been practical or possible for the heating of the cooking surface to respond rapidly to each and every load placed on the cooking surface. Accordingly, the thermal inertia of the grill has been the accepted practice for controlling the temperature at a desired level without significant variations. However, the large mass of the grill results in especially heavy and bulky equipment that must be shipped and set up in commercial cooking environments. Additionally, the amount of energy that is used to heat an entire grill to the desired temperature is considerable, and if the entire cooking surface is not being used, additional amounts of energy are wasted in keeping the temperature of the massive grill at the desired level.

For temperature sensing and feedback to control the temperature of the grill, thermocouples are typically placed in certain areas of the underside of the grill. However, the number of thermocouples that can be employed is limited due to space and cost considerations. Additionally, thermocouples in these applications generally have a relatively slow response time due to their distance away from the surface of the grill. Because of the limited number of temperature sensors, real time verification of actual temperatures along the grill has not been possible with known systems.

Most commercial cooking today is the result of temperature averaging driven by the thermal inertia of the massive grill. The grill is controlled as a single loop so that the entire grill, or large sections of the grill, run at a desired average temperature. Accordingly, there has not been a means by which to efficiently identify exactly what load has been placed on the grill, e.g. hamburger patties, much less a means to easily and automatically determine where the new load has been placed on the cooking surface of the grill.

While control systems exist that can be programmed for specific cooking schedules or temperature profiles, there has been a need for a system that can automatically sense the exact location and type of load introduced, identify the appropriate cooking schedule or temperature profile, and heat just that load according to the appropriate schedule.

SUMMARY

In one preferred form, the present disclosure provides a heater system comprising a substrate defining a heating surface, a layered heater formed on the heating surface, the layered heater defining at least one resistive heating layer, and a plurality of nodes disposed along the heating surface and in electrical contact with the resistive heating layer. Additionally, a plurality of lead wires are provided that are connected to the plurality of nodes, along with a multiplexer in communication with the plurality of nodes through the plurality of lead wires. A controller is in communication with the multiplexer, wherein the multiplexer sequences and transmits resistances from the plurality of nodes to the controller, and the controller controls an amount of power provided to each of the plurality of nodes based on the differences in resistances between the nodes.

In another form, a heated cooking grill is provided that comprises a grill body defining a cooking surface and a heating surface opposite the cooking surface, a layered heater formed on the heating surface, the layered heater defining at least one resistive heating layer, and a plurality of nodes disposed along the heating surface and in electrical contact with the resistive heating layer. Differences in resistances between the plurality of nodes are determined in order to provide requisite power to the plurality of nodes as a function of loads placed on the cooking surface.

In yet another form, a heater system is provided that comprises an upper substrate, a lower substrate, and a resistive heating material disposed between the upper substrate and the lower substrate. A voltage source is electrically connected to the lower substrate, and the resistive heating material defines a positive temperature coefficient material such that when a load is placed on the upper substrate, the resistive heating material provides for an increase in power proximate the load.

According to a method of the present disclosure, power to a heating surface in response to a load is controlled by measuring differences in resistances between a plurality of nodes disposed along the heating surface and in electrical contact with a resistive heating layer of a layered heater, and selectively providing power to the plurality of nodes as a function of the differences in resistance.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description of the preferred embodiments is merely exemplary in nature and is in no way intended to limit the disclosure, its application, or uses.

In accordance with the principles of the present disclosure, the amount of mass to be heated or cooled, for example in a commercial cooking application, is significantly reduced in order to more accurately control actual temperature response and schedules of a thermal loop. Additionally, the present disclosure employs layered heating technology in order to provide both intimate contact with the mass to be heated and to improve response time through the properties of layered heater materials. Such layered heater technologies and constructions are described in greater detail in copending application Ser. No. 10/752,359 titled "Combined Material Layering Technologies," filed on Jan. 6, 2004, which is commonly owned with the present application and the contents of which are incorporated herein by reference in their entirety.

Figure 1:
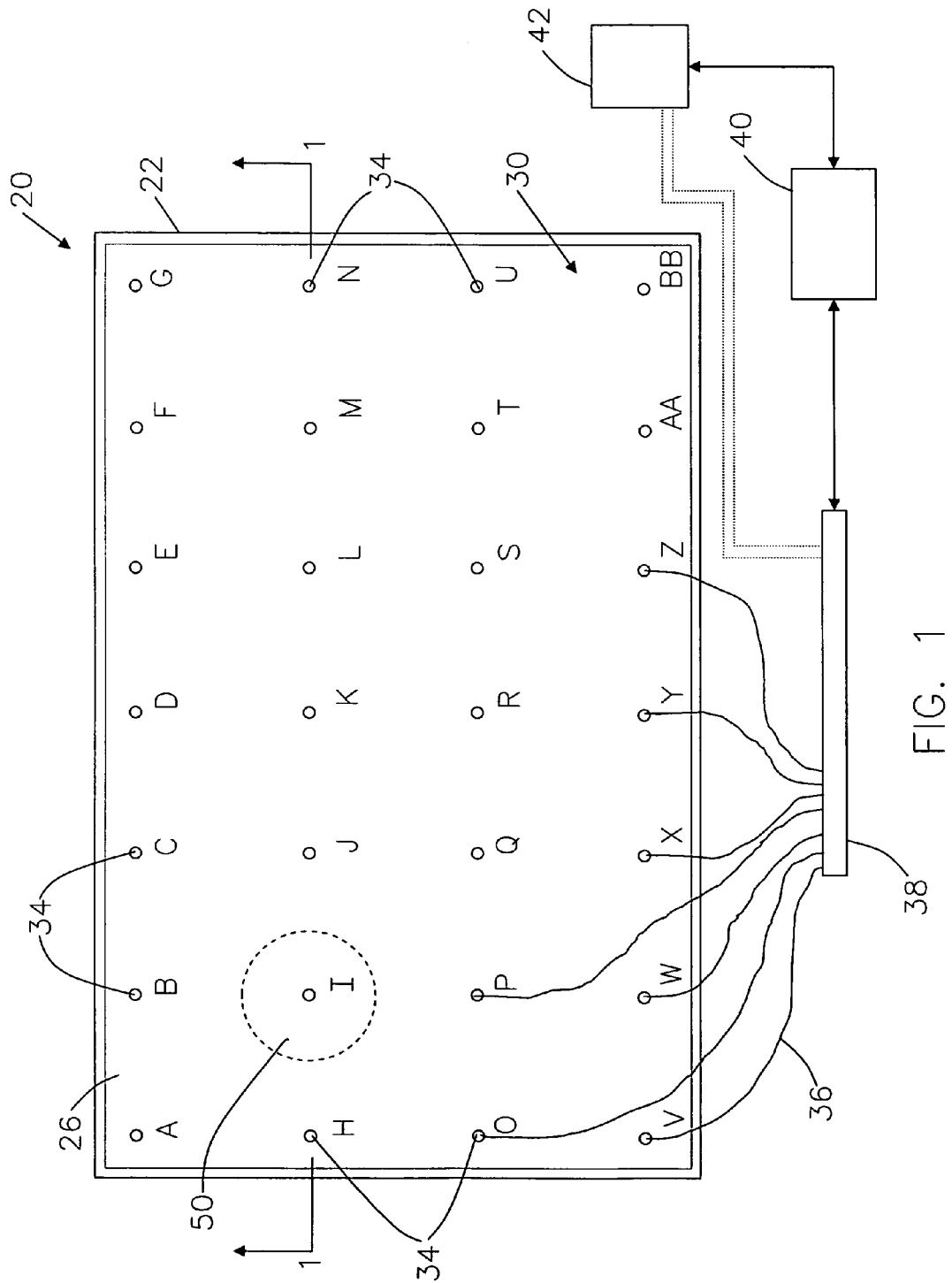
FIG. 1 is a bottom view of a heater system having a substrate defining a heating surface with nodes and constructed in accordance with the principles of the present disclosure.
Figure 2:
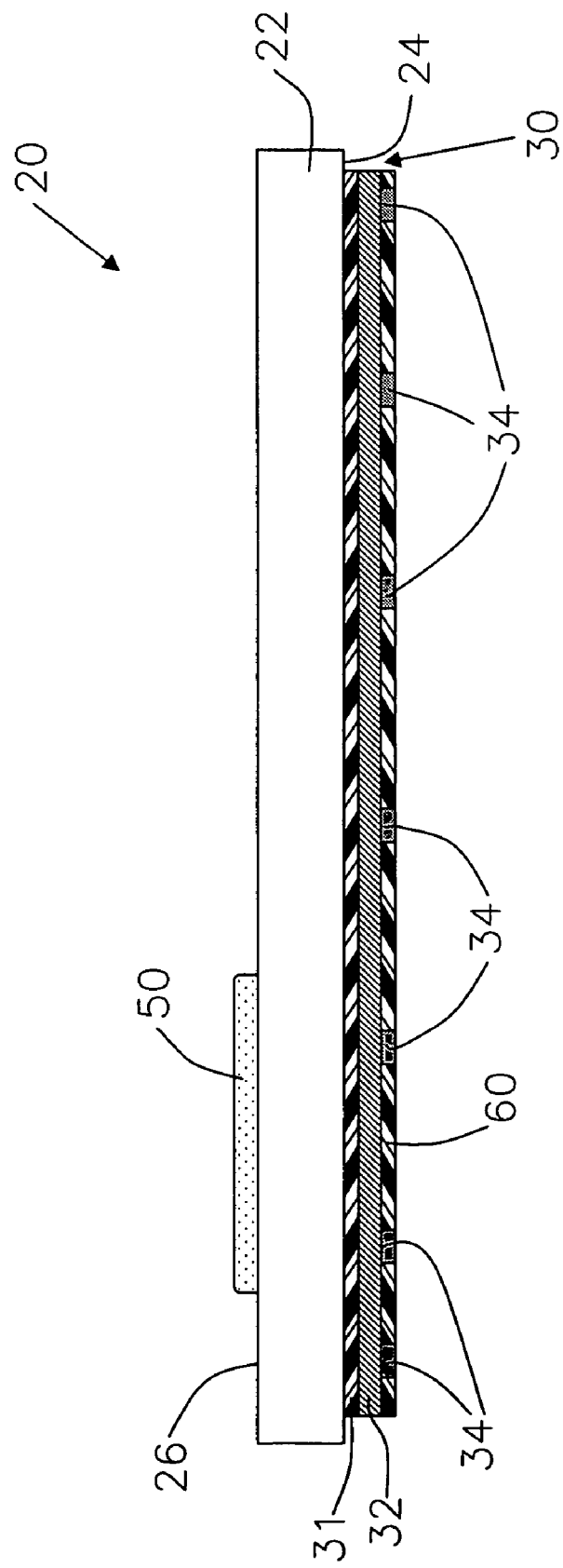
FIG. 2 is a cross-sectional view, taken along line 1-1 of FIG. 2, of the heater system constructed in accordance with the principles of the present disclosure.

Referring now to FIGS. 1 and 2, a heater system in accordance with one form of the present disclosure is illustrated and generally indicated by reference numeral 20. The heater system 20 comprises a substrate 22 defining a heating surface 24 and a load surface 26 opposite the heating surface 24. A layered heater 30 is disposed on the heating surface 24, wherein the layered heater 30 comprises a dielectric layer 31 on the heating surface 24, and at least one resistive heating layer 32 over the dielectric layer 31. The resistive heating layer 32 as shown defines a continuous pattern that substantially covers the entire heating surface 24. However, other patterns of the resistive heating layer 32, as described in greater detail below, may also be employed while remaining within the scope of the present disclosure.

A plurality of nodes 34 are disposed along the heating surface 24 and are in electrical contact with the resistive heating layer 32 as shown. The nodes 34 function as terminal pads and are configured to provide power to the resistive heating layer 32 at each of the nodes 34 as required. Accordingly, a corresponding plurality of lead wires 36 are connected to the nodes 34, and a multiplexer 38 is in communication with the plurality of nodes 34 through the lead wires 36. For purposes of clarity, not all of the lead wires 36 are shown, and it should be understood that at least one lead wire 36 is connected from the multiplexer 38 to each of the nodes 34. A controller 40 is also provided, which is in communication with the multiplexer 38 as shown, in order to control the amount of power delivered to each of nodes 34 from a power supply 42, as described in greater detail below.

As further shown in FIG. 2, another dielectric layer 60 is formed over the resistive heating layer 32, but not over the nodes 34, in an alternate form of the present disclosure. The dielectric layer 60 provides protection for the outside environment from the resistive heating layer 32 while also providing protection and thermal insulation for the resistive heating layer 32.

The nodes 34, which function as terminal pads as commonly used in layered heaters, are formed of a highly electrically conductive material that can transfer the requisite power to the resistive heating layer 32. The nodes 34 are thus formed directly onto the resistive heating layer 32 in the desired locations according to the number of nodes 34 desired for a particular application. The lead wires 36 are joined to the nodes 34 using techniques such as soldering, brazing, or ultrasonic welding, among others.

In another form of the present disclosure, the nodes 34 may be formed of a more advanced material, such as, by way of example, a semiconductor material. As such, the resistance of an individual node 34 would have a wide range in resistance versus temperature, and the resistance of each node 34 could be monitored at predetermined time intervals. The differences in resistances of an individual node 34 over time could then be compared, rather than comparing differences in resistances between pairs of nodes 34, thus reducing the complexity of the multiplexing function, which is described in greater detail below.

In order to provide the proper amount of heat in the proper location, the resistance between each of the plurality of nodes 34 is continuously monitored, and the differences in resistances between the plurality of nodes 34 is used in order to provide the requisite amount of power to the nodes 34 and thus to the substrate 22, thereby providing an accurate and highly tailored temperature profile to the load surface 26. For example, when a load 50, e.g. a hamburger patty, is placed on the load surface 26, the resistance between node I and the surrounding nodes, A, B, C, H, J, O, P, and Q, will decrease, while the resistance between these surrounding nodes, and the other nodes D-G, K-N, R-U and V-BB, does not change substantially. The difference in resistance between node I and the surrounding nodes thus indicates that the load 50 has been placed on the load surface 26, and the location where the load 50 has been placed, and thus an increase in power is needed in order to increase the temperature in this area. Therefore, the present disclosure contemplates determining the differences in resistances between the plurality of nodes 34 and controlling the amount of power provided to the plurality of nodes 34 in order to provide a tailored temperature profile to the load surface 26.

To accomplish the monitoring of nodes 34 and subsequently controlling the power thereto, in one form, the multiplexer 38 sequences and transmits resistances from the plurality of nodes 34 to the controller 40, and the controller 40 controls the amount of power from the power source 42 that is provided to each of the plurality of nodes 34 based on the differences in resistances between the nodes 34. The multiplexer 38 continuously sequences between each combination of nodes 34, e.g., A-B, A-I, I-Q, etc., and transmits resistances to the controller 40. Additionally, software may be employed within the controller 40, as described in greater detail below, to facilitate the control of power to the nodes 34.

Figure 3:
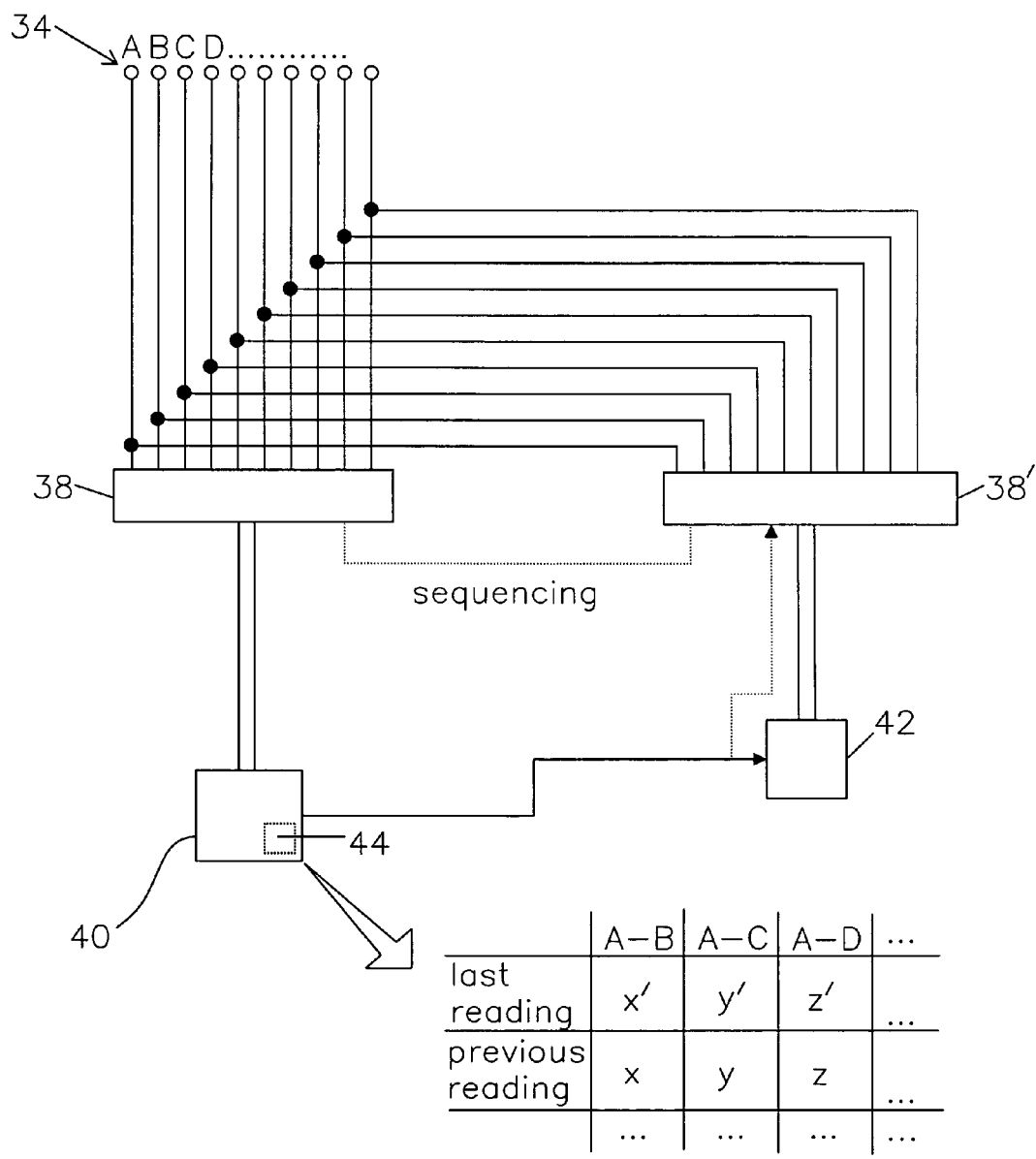
FIG. 3 is a block diagram illustrating communications between nodes, multiplexers, and a controller in accordance with one form of the present disclosure.

More specifically, and with reference to FIG. 3, either one or a plurality of multiplexers, 38 and 38', connects each lead wire 36 to the controller 40 for the purpose of both resistance reading and power application multiple times per second, thus providing a highly responsive and automatic system for sensing, control and response. In the exemplary embodiment as illustrated herein, the multiplexer 38 electronically switches to a first pair of leads 36' and 36" and transmits signals from the nodes 34 connected to this particular set of leads to the controller 40. The controller 40 then reads the resistance between leads 36' and 36" and places the reading in a push down stack memory 44. The controller 40 is programmed to recognize any difference between each new reading and previous readings for each pair in a multiplexed sequence and thus recognizes if there has been a temperature change in any specific areas of the load surface 26. Accordingly, the controller 40 then decides if power must be applied to any pair(s) of leads based on the temperature change.

Rather than through the same multiplexer, the power may be applied in a second multiplexer 38' as shown, such that one multiplexer 38 sequences and transmits resistance signals from the nodes 34, and the other multiplexer 38' sequences and transmits power to the plurality of nodes 34. In one form, power to a pair of lead wires 36 can be applied instantly after each resistance reading is taken and before the multiplexer 38 electronically switches the connection to another pair of lead wires 36. Therefore, multiplexer 38 and multiplexer 38' are synchronized such that, by way of example, when multiplexer 38 connects the controller 40 to a pair of lead wires 36, multiplexer 38' is making a connection from the power supply 42 to a different pair of lead wires 36 and nodes 34 according to instructions from the controller 40, which are based on comparing differences in resistances between the nodes 34, in addition to preprogrammed decision algorithms if desired.

Alternate timing schemes and configurations of multiplexers may also be employed in accordance with the teachings of the present disclosure, and it should be understood that the embodiment described herein should not be construed as limiting the scope of the present disclosure. And as described in greater detail below, preprogrammed temperature profiles may also be employed, as a function of the type of load 50.

In one form, the substrate 22 is a heated cooking grill. Accordingly, the load surface 26 is a cooking surface, and the plurality of nodes 34 are configured according to the size of cooking loads such as, by way of example, hamburger patties or eggs. As cooking loads are placed on the cooking surface, the differences in resistances between the plurality of nodes 34 are determined in order to provide requisite power to the plurality of nodes 34 as a function of the cooking loads placed on the cooking surface. Therefore, with the use of layered heaters having more intimate contact with the substrate 22 and their improved material properties over traditional heaters, combined with the principles of the nodes 34 according to the teachings of the present disclosure, the amount of mass that needs to be heated and/or cooled is significantly reduced while controlling temperature and response time more accurately. Reducing the mass lowers the thermal inertia of the substrate 22 and thus allows for more rapid response to the addition or removal of heat to obtain a desired temperature at a specific location.

Figure 4:
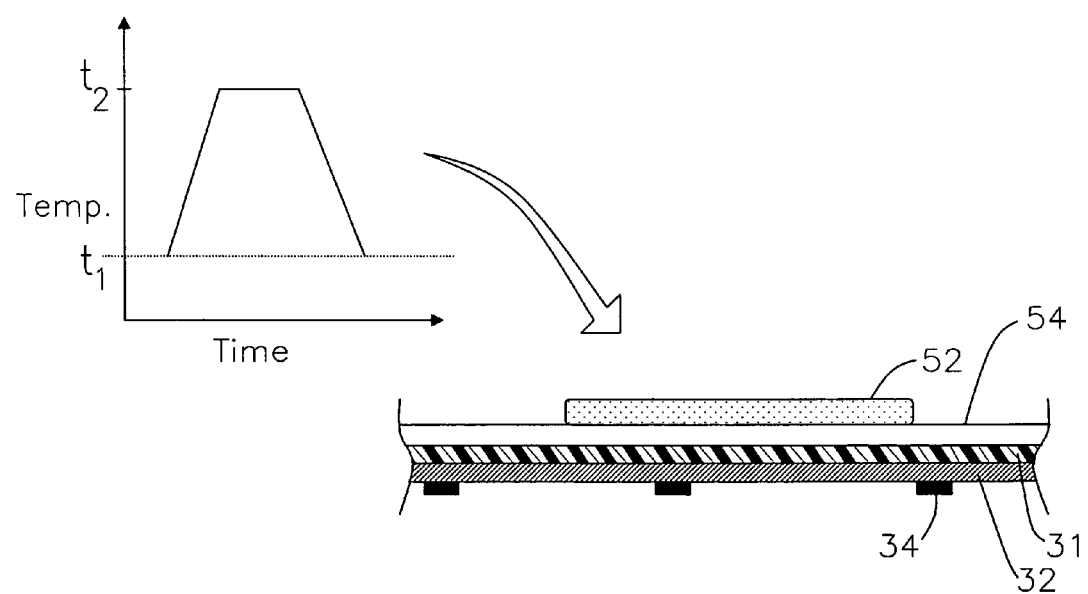
FIG. 4 is a side view of a load placed on a heated grill and a corresponding temperature profile that is employed in accordance with the principles of the present disclosure.

According to a method of the present disclosure, a predetermined power profile, or recipe, is provided to the plurality of nodes 34 as a function of the differences in resistances of a specific cooking load. The predetermined power profile corresponds with a temperature profile, or recipe, that is desired for the specific type, e.g. hamburger patty, of cooking load. For example, as shown in FIG. 4, a cooking load 52 is placed onto a cooking surface 54 and must be cooked to a certain temperature profile 56 as shown. Prior to placement of the cooking load 52 onto the cooking surface 54, the cooking surface 54 is maintained at a steady state temperature t1. After the cooking load 52 is placed on the surface, differences in resistances between the nodes 34 are determined and the controller 40 (not shown) provides the requisite power to the nodes 34 in a proper sequence, as previously described, such that the cooking load 52 is brought to a desired temperature t2 over a period of time as shown. The cooking load 52 remains at temperature t2 for another period of time, and then is brought down to the steady state temperature t1 at or over another period of time as illustrated by the temperature profile 56. As a result, the cooking surface 54 can be maintained at a lower temperature, thus conserving energy, and the cooking load 52 is automatically cooked according to a desired recipe. Due to the reduction in thermal inertia provided by the present disclosure, the increased response time enables temperature profiling as illustrated herein. Additionally, automatically applying a predetermined recipe to specific types of cooking loads, as opposed to a manually operated system, could reduce the risks of undercooked foods and their related health risks. Moreover, it should be understood that the temperature profile as illustrated herein is merely exemplary and should not be construed as limiting the scope of the present disclosure.

Through the specific differences in resistances between the nodes 34 as determined by the heater system 20, the type of cooking load 52 can be automatically determined, and thus the appropriate temperature profile 56 can be automatically loaded and executed without the need for manual intervention. In one form, the temperature profiles 56 are loaded as software or firmware into the controller 40 and can be updated and modified as necessary.

Figure 5:
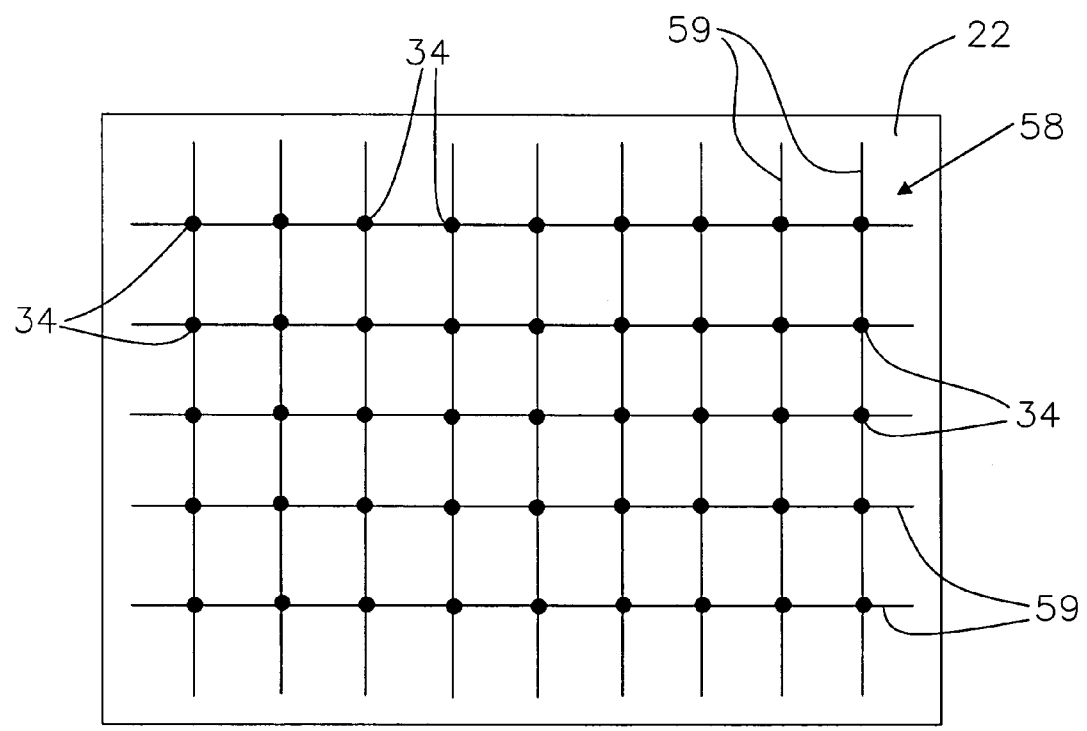
FIG. 5 is a bottom view of an alternate embodiment of the heater system of FIG. 1 having a trace pattern and constructed in accordance with the principles of the present disclosure.

Referring now to FIG. 5, the resistive heating layer 32 defines a trace pattern 58 as shown rather than a continuous pattern as previously described and illustrated. The nodes 34 are thus disposed along the individual traces 59 and power is applied to the nodes 34 as described above in accordance with differences in resistances between the nodes 34. (The lead wires 36, multiplexer 38, controller 40, and power source 42 are not illustrated for purposes of clarity). The trace pattern 58 as shown is generally a linear grid shape, however, it should be understood that other shapes, e.g., serpentine, circular, along with different types of circuits, i.e., parallel, series, parallel-series combinations, may also be employed while remaining within the scope of the present disclosure. Additionally, the circuit may employ the teachings of copending application Ser. No. 10/941,609, titled "Adaptable Layered Heater System," filed on Sep. 15, 2004, which is commonly owned with the present application and the contents of which are incorporated herein by reference in their entirety. For instance, the resistive traces and their circuit configurations as described therein, may be employed between nodes and in a grid configuration as described herein and are considered to be within the scope of the present disclosure.

Figure 6:
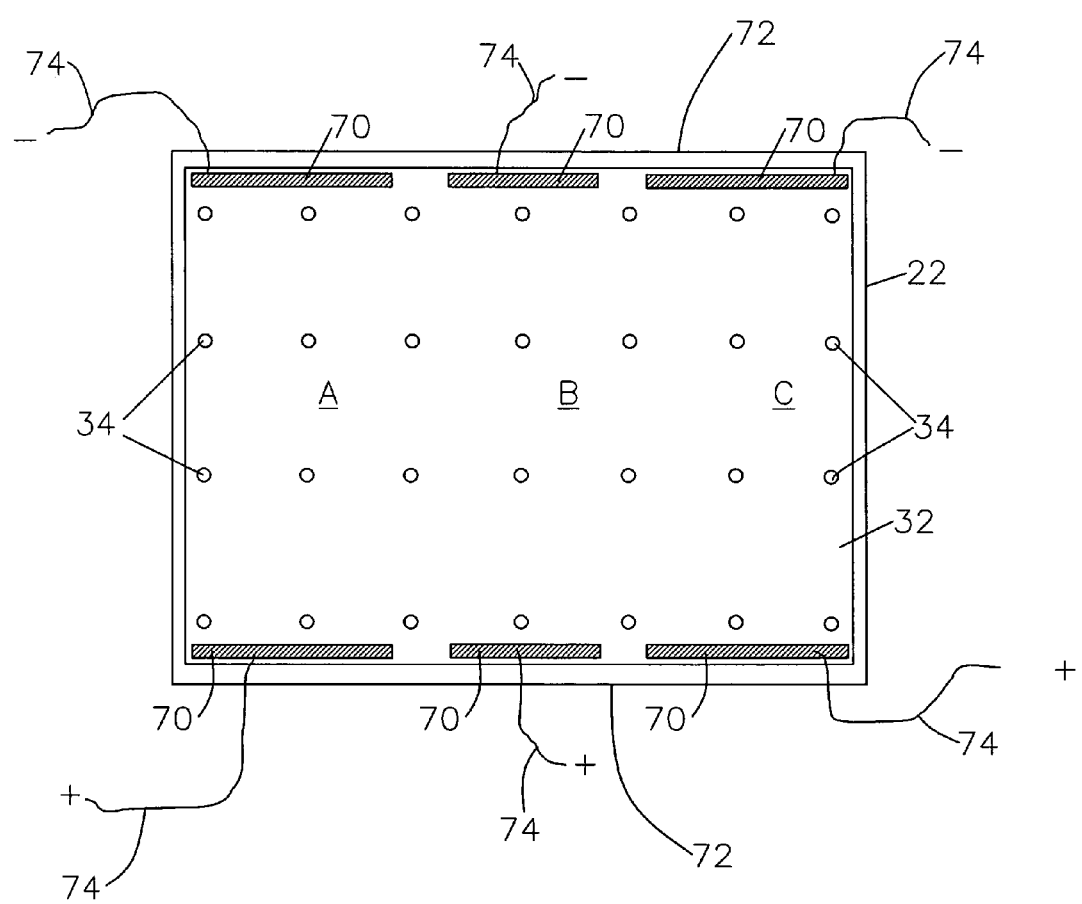
FIG. 6 is a bottom view of an alternate embodiment of a heater system having bus bars and nodes and constructed in accordance with the principles of the present disclosure.

Yet another form of the present disclosure is illustrated in FIG. 6, wherein in addition to the nodes 34, a plurality of bus bars 70, which may be of varying shapes and sizes, are disposed along an outer periphery 72 of the heating surface 24. The bus bars 70, which function as terminal pads as previously described, are in direct contact with the resistive heating layer 32 and are thus in electrical contact therewith. Lead wires 74 are connected to the bus bars 70, and may also be connected to the multiplexer 38 (not shown), in order to provide heat within the larger zones of A, B, and C as shown. As such, a more coarse distribution of power can be applied to the substrate 22 rather than, or in addition to, the more tailored application of power through the nodes 34. It should also be understood that any number of bus bars 70 may be employed in any location along the heating surface 24, in addition to along the periphery 72 and in the number and size illustrated herein. It should also be understood that the bus bars 70 may be employed with other shapes and configurations of the resistive heating layer 32, such as the linear grid as illustrated in FIG. 5, while remaining within the scope of the present disclosure.

Figure 7:
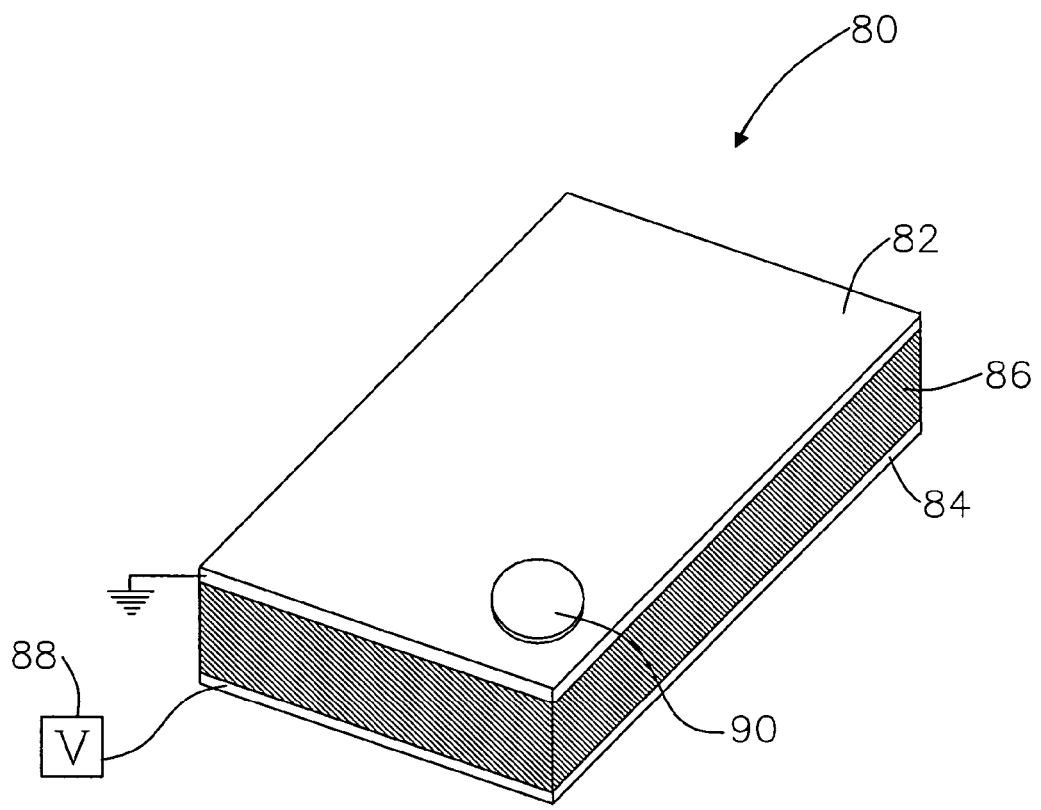
FIG. 7 is perspective cutaway view of another embodiment of a heater system employing a positive temperature coefficient (PTC) material and constructed in accordance with the principles of the present disclosure.

Referring now to FIG. 7, another form of a heater system in accordance with the teachings of the present disclosure is illustrated and generally indicated by reference numeral 80. The heater system 80 comprises an upper substrate 82, a lower substrate 84, and a resistive heating material 86 disposed between the upper substrate 82 and the lower substrate 84. As further shown, a voltage source 88 is electrically connected to the lower substrate 84, while the upper substrate 82 serves as a ground. However, the upper substrate 82 would not necessarily have to function as a ground and could instead be operated at a voltage different than that of the lower substrate 84. The resistive heating material 86 defines a positive temperature coefficient (PTC) material such that when a load 90 is placed on the upper substrate 82, the resistive heating material 86 provides for an increase in power proximate the load 90.

The PTC material could be selected from among many types of materials such as Platinum that exhibit PTC characteristics. Platinum and other materials having such PTC characteristics can be used directly in the construction of a layered heater circuit, i.e. the resistive heating layer, or as dopants in other materials such as glass, ceramics, and polymers to achieve a composite material that displays a significant shift in electrical properties as a function of temperature. Another method of creating a material with PTC characteristics is to use conductive particles such as carbon in a matrix of ceramic or polymer composite in which the glass, ceramic, or polymer matrix expands and contracts significantly with temperature. The expansion of the base material with temperature causes a breaking up of the electrical connections from particle to particle within the matrix and thereby increases the overall electrical resistance of the material corresponding to the material temperature. An example of such a method is described in U.S. Pat. No. 5,902,518, which is commonly owned with the present application and the contents of which are incorporated herein by reference in their entirety.

In operation, a voltage is set that corresponds with a desired cooking temperature, which is transferred through the voltage source 88, through the lower substrate 84, through the resistive heating material 86, and to the upper substrate 82. When the load 90 is placed on the upper substrate 82, the resistance of the PTC material goes down due to the lower temperature of the load 90 relative to the upper substrate 82. Since the voltage is constant and the resistance of the PTC material 86 initially goes down, more current flows in the region of the load 90. This relationship may be more clearly understood by the equation of voltage versus current and resistance:

$$V = I^2 R; \text{ where V=voltage, I=current, and R=resistance}$$

As the current increases to compensate for the lower temperature of the load 90, the resistance of the PTC material 86 eventually increases with the increase in temperature until the desired temperature is reached. Accordingly, the heater system 80 automatically adjusts the temperature in response to the load 90 placed on the upper substrate 82, thereby providing a more tailored and controlled temperature response.

Figure 8:
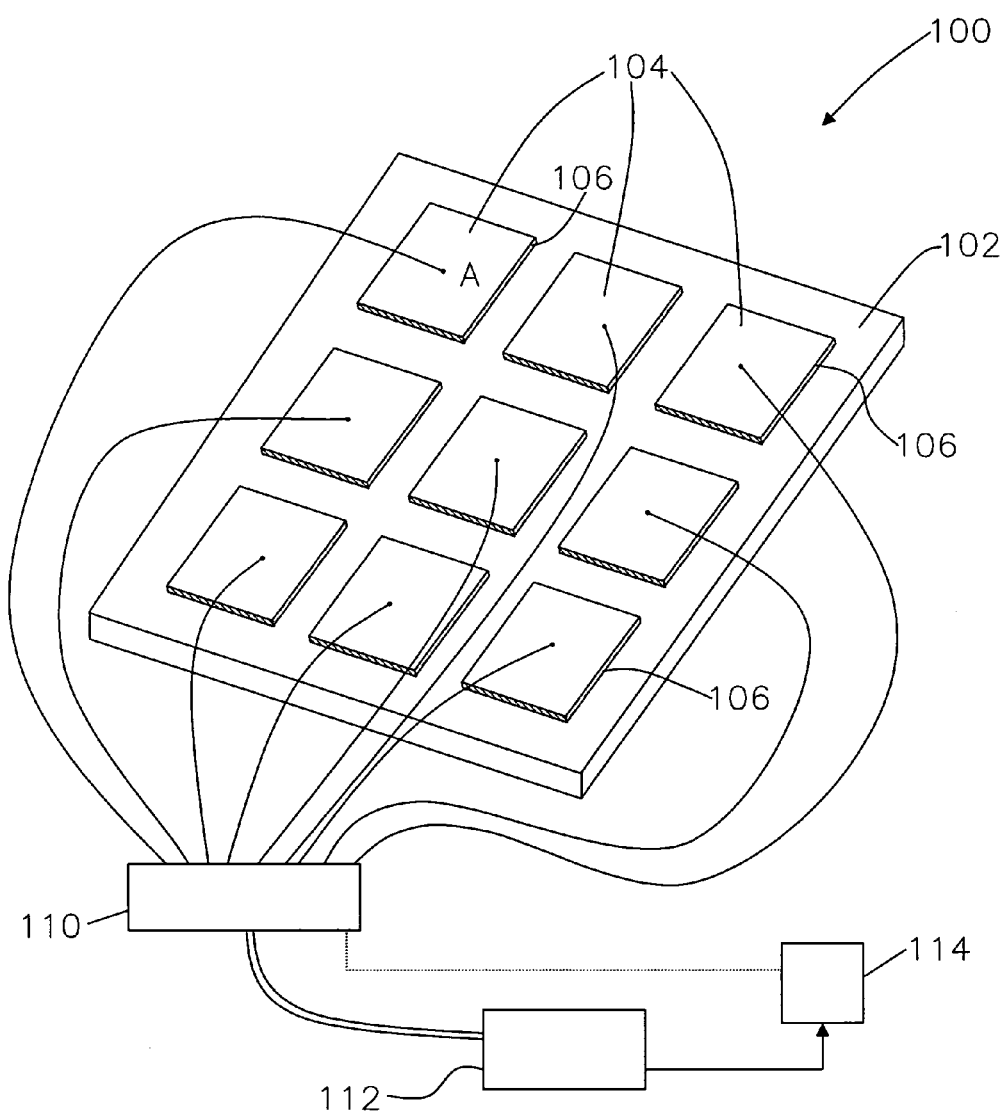
FIG. 8 is a perspective view of a second embodiment of a heater system employing PTC materials and constructed in accordance with the principles of the present disclosure.

Referring to FIG. 8, another form of a heater system using PTC materials in accordance with the teachings of the present disclosure is illustrated and generally indicated by reference numeral 100. The heater system 100 comprises a lower substrate 102 and a plurality of upper substrates 104, wherein a plurality of heating elements 106 formed of a PTC material are disposed between the lower substrate 102 and the upper substrates 104. Additionally, a plurality of lead wires 108 connect the plurality of upper substrates 104 and heating elements 106 to a multiplexer 110, which is connected to a controller 112 and a power supply 114. Therefore, the heater system 100 provides individual heating zones proximate each of the plurality of upper substrates 104 and heating elements 106.

With this zoned heater system 100, a specific temperature and/or power profile (or recipe) can be provided to discrete zones based on variations of voltage over time. For example, if a load is placed proximate zone A, the resistance of the heating element 106 of this zone initially goes down a certain amount, and as a result, the current in this zone increases, followed by an increase in temperature. By varying the voltage over time, the controller 112 can achieve a specific profile, which is commanded by the controller 112 to the power supply 114, such that the load proximate zone A receives a desired temperature profile. Therefore, a PTC material is combined with temperature profiling to tailor the amount and location of heat that is delivered to a load. It should be understood that operation of the multiplexer 110, controller, 112, and power supply 114 are in accordance with the teachings of the present disclosure as previously described.

The description of the disclosure is merely exemplary in nature and, thus, variations that do not depart from the gist of the disclosure are intended to be within the scope of the disclosure. For example, although the substrate 22 is illustrated as flat and rectangular, it should be understood that any shape of substrate 22 may be employed, e.g. non-flat such as tubular, and other flat shapes such as circular, while remaining within the scope of the present disclosure. Additionally any number of nodes 34 may be employed to form either coarser or finer grids of nodes 34 according to specific application requirements, in addition to non-uniform grids of nodes 34, while not departing from the spirit and scope of the present disclosure. Moreover, other parameters besides or in addition to differences in resistances may be sensed while remaining within the scope of the present disclosure. For example, a response to a high frequency stimuli, conductance, and inductance may also be sensed in accordance while remaining within the scope of the present disclosure. Such variations are not to be regarded as a departure from the spirit and scope of the disclosure.

What is claimed is:

1. A heater system comprising:
    a substrate defining a heating surface;
    a layered heater formed on the heating surface, the layered heater defining at least one resistive heating layer;
    a grid of nodes having more than two nodes disposed along the heating surface and in electrical contact with the resistive heating layer;
    a plurality of lead wires connected to the grid of nodes;
    a multiplexer in communication with the grid of nodes through the plurality of lead wires; and
    a controller in communication with the multiplexer,
    wherein the multiplexer sequences and transmits resistances from the grid of nodes to the controller, and the controller controls an amount of power provided to each of the grid of nodes based on the differences in resistances between the nodes.

2. The heater system according to claim 1, wherein the resistive heating layer is formed from a layered process selected from the group consisting of thick film, thin film, thermal spray, and sol-gel.

3. The heater system according to claim 1, wherein the resistive heating layer defines a trace pattern.

4. The heater system according to claim 1, wherein the resistive heating layer defines a continuous pattern that substantially covers the heating surface.

5. The heater system according to claim 1 further comprising a plurality of heating zones, wherein each heating zone comprises a grid of nodes, and the controller controls the amount of power provided to each of the heating zones based on the differences in resistances between the nodes.

6. The heater system according to claim 1 further comprising a dielectric layer formed on the resistive heating layer but not over the nodes.

7. The heater system according to claim 1, wherein the heating surface defines an outer periphery and the heater system further comprises a plurality of bus bars disposed along the outer periphery, the bus bars being in electrical contact with the resistive heating layer,
wherein the controller controls the amount of power provided to the plurality of bus bars based on the differences in resistances between the bus bars.

8. The heater system according to claim 1, wherein the nodes are formed of a semiconductor material.

9. A heated cooking grill comprising:
a grill body defining a cooking surface and a heating surface opposite the cooking surface;
a layered heater formed on the heating surface, the layered heater defining at least one resistive heating layer; and
a grid of nodes having more than two nodes disposed along the heating surface and in electrical contact with the resistive heating layer,
wherein differences in resistances between the grid of nodes are determined in order to provide requisite power to the grid of nodes as a function of loads placed on the cooking surface.

10. The heated cooking grill according to claim 9, wherein the resistive heating layer defines a trace pattern.

11. The heated cooking grill according to claim 9, wherein the resistive heating layer defines a continuous pattern that substantially covers the heating surface.

12. The heated cooking grill according to claim 9 further comprising a plurality of heating zones, wherein each heating zone comprises a grid of nodes, and a controller controls the amount of power provided to each of the heating zones based on the differences in resistances between the nodes.

13. The heated cooking grill according to claim 9 further comprising a dielectric layer formed on the resistive heating layer but not over the nodes.

14. The heated cooking grill according to claim 9, wherein the heating surface defines an outer periphery and the heater system further comprises a plurality of bus bars disposed along the outer periphery, the bus bars being in electrical contact with the resistive heating layer,
wherein a controller controls the amount of power provided to the plurality of bus bars based on the differences in resistances between the bus bars.

15. The heated cooking grill according to claim 9 further comprising:
a multiplexer in communication with the plurality of nodes; and
a controller in communication with the multiplexer,
wherein the multiplexer sequences and transmits resistances from the grid of nodes to the controller, and the controller controls an amount of power provided to each of the grid of nodes based on the differences in resistances between the nodes.

16. The heated cooking grill according to claim 9, wherein the nodes are formed of a semiconductor material.

17. A method of controlling power to a heating surface in response to a load comprising measuring differences in resistances between a grid of nodes having more than two nodes disposed along the heating surface and in electrical contact with a resistive heating layer of a layered heater, and selectively providing power to the grid of nodes as a function of the differences in resistances.

18. The method according to claim 17, wherein a predetermined power profile is provided to the grid of nodes as a function of the differences in resistance.

19. The method according to claim 17, wherein software determines the differences in resistances.

* * * * *